US012437567B2

(12) United States Patent
Albertini et al.

(10) Patent No.: US 12,437,567 B2
(45) Date of Patent: Oct. 7, 2025

(54) COMPUTER-IMPLEMENTED METHOD FOR OPTICAL CHARACTER RECOGNITION

(71) Applicant: ANYLINE GmbH, Vienna (AT)

(72) Inventors: Daniel Albertini, Vienna (AT); David Dengg, Vienna (AT); Martin Cerman, Vienna (AT); Peter Sperl, Vienna (AT); Hannes Duchkowitsch, Vienna (AT)

(73) Assignee: ANYLINE GmbH, Vienna (AT)

( * ) Notice: Subject to any disclaimer, the term of this patent is extended or adjusted under 35 U.S.C. 154(b) by 398 days.

(21) Appl. No.: 17/754,198

(22) PCT Filed: Sep. 30, 2020

(86) PCT No.: PCT/EP2020/077362
§ 371 (c)(1),
(2) Date: Mar. 25, 2022

(87) PCT Pub. No.: WO2021/064018
PCT Pub. Date: Apr. 8, 2021

(65) Prior Publication Data
US 2022/0327849 A1 Oct. 13, 2022

(30) Foreign Application Priority Data
Sep. 30, 2019 (EP) .................... 19200582

(51) Int. Cl.
G06K 9/00 (2022.01)
G06V 10/82 (2022.01)
(Continued)

(52) U.S. Cl.
CPC .............. *G06V 30/10* (2022.01); *G06V 10/82* (2022.01); *G06V 30/1916* (2022.01)

(58) Field of Classification Search
CPC ............................ G06V 10/82; G06V 30/1916
See application file for complete search history.

(56) References Cited

U.S. PATENT DOCUMENTS 6,301,381 B1* 10/2001 Hayashi ............... G06V 30/413
382/176
10,007,863 B1* 6/2018 Pereira .................... G06T 7/337
(Continued)

FOREIGN PATENT DOCUMENTS

CN    109087236 A    12/2018
JP    2002342739     11/2002
(Continued)

OTHER PUBLICATIONS

Hand Written Character Recognition Using Back Propagation Network, Srinivasa Kumar Devireddy et al., 2009, pp. 257-269 (Year: 2009).*

(Continued)

Primary Examiner — Jayesh A Patel
(74) Attorney, Agent, or Firm — Husch Blackwell LLP

(57) ABSTRACT

A computer-implemented method for optical character recognition and corresponding data processing apparatus, computer program and computer-readable medium. The method includes the following: receiving image data of an input image having one or more characters and applying one or more data processing operations to the received image data, wherein at least one of the data processing operations is configured to return the one or more characters of the input image, wherein each data processing operation is selected from a predefined set of available data processing functions according to a processing configuration, wherein the available data processing functions are precompiled functions, and wherein the processing configuration can be changed at runtime.

11 Claims, 8 Drawing Sheets

(51) Int. Cl.
  *G06V 30/10* (2022.01)
  *G06V 30/19* (2022.01)

(56) References Cited

U.S. PATENT DOCUMENTS

| | | | | |
|---|---|---|---|---|
| 10,621,727 | B1* | 4/2020 | Becker | G06V 30/412 |
| 2013/0219307 | A1 | 8/2013 | Raber et al. | |
| 2017/0177968 | A1 | 6/2017 | Albertini | |
| 2018/0033147 | A1* | 2/2018 | Becker | G06V 30/412 |
| 2019/0073571 | A1* | 3/2019 | Kalyuzhny | G06V 30/274 |
| 2019/0073681 | A1 | 3/2019 | Chen | |
| 2019/0080164 | A1* | 3/2019 | Duke | G06V 30/422 |
| 2019/0236445 | A1* | 8/2019 | Das | G11C 13/0002 |
| 2019/0392196 | A1* | 12/2019 | Sagonas | G06V 30/40 |
| 2020/0202173 | A1* | 6/2020 | Oishi | G06V 30/19173 |

FOREIGN PATENT DOCUMENTS

| | | |
|---|---|---|
| JP | 2003122442 | 4/2003 |
| JP | 2019505149 | 2/2019 |

OTHER PUBLICATIONS

Optical Character Recognition by a Neural Network, Michael Sabourin et al., 1992, pp. 843-852 (Year: 1992).*
Optical Character Recognition using Back Propagation Neural Network, Shyla Afroge et al., 2016, IEEE, pp. 1-4 (Year: 2016).*
Notice of Reasons for Rejection (Office Action) dated Apr. 25, 2023 for Japanese Patent Appl. No. 2022-519974.
Sabourin, Michael, et al.; "Optical Character Recognition by a Neural Network"; Neural Networks, vol. 5, Issue 5; Elsevier Science Direct; Pergamon Press Ltd.; Sep. 1, 1992; 10 Pages.
Chattopadhyay, Tanushyam, et al.; "Automatic Selection of Binarization Method for Robust OCR"; 2013 12th International Conference on Document Analysis and Recognition; IEEE; Washington, DC, USA; Aug. 25, 2013; 5 Pages.
Beale, Mark Hudson, et al.; "Neural Network Toolbox (TM), User's Guide"; Matlab (R), MathWorks; Natick, MA.; Feb. 2, 2015; 2 Pages.
Extended European Search Report; Application No. 19200582.5; Completed: Apr. 2, 2020; Issued: Apr. 14, 2020; 22 pages.
International Search Report and Written Opinion of the International Searching Authority; PCT/EP2020/077362; Completed: Oct. 22, 2020; Mailing Date: Oct. 30, 2020; 15 Pages.

* cited by examiner

COMPUTER-IMPLEMENTED METHOD FOR OPTICAL CHARACTER RECOGNITION

TECHNICAL FIELD

The present teaching concerns a computer-implemented method for optical character recognition, the method comprising: receiving image data of an input image comprising one or more characters (i.e., text) and applying one or more data processing operations to the received image data, wherein at least one of the data processing operations is configured to return the one or more characters of the input image.

BACKGROUND

Such a method is disclosed in US 2017/0177968 A1 specifically for optical detection of symbols displayed on a display.

In applications of this type, the processing operations often need to be tailored for the specific use-case to achieve acceptable recognition performance. This is particularly true for use-cases where the characters to be recognized have very little contrast and visible contours. The process of tailoring the processing operations requires as many sample images of the use-case as possible. Collecting theses sample images is time consuming and costly. Therefore, tailoring is often an iterative process performed during production based on production images. However, iterations are complicated by the fact that the processing operations involved are CPU-intensive and optimized for a particular hardware.

For a completely different field, namely for multivariate testing of user interfaces, US 2013/0219307 A1 foresees a user interface definition that can be changed at runtime. Such a user interface definition does not concern how the application processes any input data, much less image data.

US 2019/0073571 A1 concerns a method for performing optical character recognition of an image depicting text symbols. The method involves using a predefined series of sets of conversion operations. Each set can be applied to a portion of the image to create a converted portion of the image. The portion of the image can be one which is detected to include a symbol sequence, which may form a word, a group of words or a line of text. The conversion operations may include changing the resolution of the portion, applying a different binarization method, changing distortion settings, glare-compensation settings, blur-control settings, or changing noise reduction operations. The sets of conversion operations can be applied to the image portion according to a predefined sequence until a detected quality of the resulting text exceeds a predetermined quality threshold.

The article "Automatic Selection of Binarization Method for Robust OCR" by Chattopadhyay et al (In: 2013 12th International Conference on Document Analysis and Recognition. IEEE, 2013. p. 1170-1174) concerns a method for selecting an optimum algorithm for the data processing operation of binarization using machine learning. In essence, a single data processing operation should be selected by a trained model from a number of given possibilities.

CN 109087236 A describes a multi-depth learning platform and industrial image detection control method and system. The method includes loading a model of a neural network and a network configuration according to general parameters and subsequently using the loaded model for optical character recognition.

The article "Optical character recognition by a neural network" by Sabourin et al (Neural networks 5.5 (1992): 843-852) discloses an optical character recognition system, which uses a multilayer perceptron neural network classifier.

SUMMARY

It is one object of the present teaching, to facilitate the tailoring of a computer-implemented method for optical character recognition.

The teaching proposes a computer-implemented method of the kind stated in the outset, wherein each data processing operation is selected from a predefined set of available data processing functions according to a processing configuration, wherein the available data processing functions are precompiled functions, and wherein the method further comprises: before applying the one or more data processing operations, loading the processing configuration from a remote service at runtime.

Hence, the processing configuration can generally be changed at runtime, e.g. replaced by the processing configuration loaded from the remote service.

In the present disclosure, precompiled means that the data processing functions are limited to a particular processing hardware, i.e. they use a hardware-defined instruction set specific to a particular hardware platform (CPU or GPU). That the processing configuration can be changed (modified or altered, e.g. updated or replaced) means, that after the change different processing operations can be used to call different data processing functions or the same data processing functions can be used differently, e.g. with different parameters or in a different sequence. At runtime refers to a situation where a software application implementing the present method is running, e.g. its instructions are loaded into the memory of a computer for being carried out. Runtime is in contrast to compile time, at which the instructions that will later be loaded are derived from a source code. In particular, the data processing functions, being precompiled (or simply "compiled") functions, cannot be changed at runtime.

The possibility of changing the processing configuration at runtime allows for easier and faster iterations. A software application implementing the present method does not need to be replaced in its entirety. The tailoring is basically a matter of configuration. Typically, configuration changes are easier to perform, faster and require lower privileges than software changes. For example, in case of a mobile application, a software update usually requires interaction with a platform provider ("store") and often involves user interaction for approving the update. On the other hand, a configuration change may be carried out unnoticed by the user.

The remote service may be hosted on one or more network servers. The use of a remote service facilitates iterations and tailoring of the data processing, because configuration changes can be distributed over a network to terminals performing the method. Because such a network may be temporarily unavailable, the processing configuration may be cached or stored locally on the terminals. The remote service may be a different distribution channel than the distribution channel used for software updates. This allows for a separation of the software provider (e.g., of a use-case specific software) and a service provider performing the tailoring of the data processing. The software provider uses the software distribution channel for deploying his software and the service provider runs the remote service from which the processing configuration is loaded by that software.

The processing configuration may, for example, determine one or more of the following: the total number of data processing operations, the sequence of two or more different data processing operations, and the parametrization of the one or more data processing operations. The parametrization of a data processing operation refers to the parameters for calling the associated data processing function, if any. These parameters are part of the definition of the respective data processing operation, i.e. two data processing operations using different parameters are themselves different.

In this context, the method optionally further comprises: validating the processing configuration received from the remote service before applying the one or more data processing operations. Since the change of the processing configuration happens or can happen at runtime, the validation helps to avoid runtime errors due to an erroneous configuration. The processing configuration may be stored locally only after successful validation. Otherwise, i.e. if the validation fails, a previous processing configuration is used.

Correspondingly, the method optionally further comprises: determining that the processing configuration received from the remote service is invalid and loading a previously cached processing configuration. It may be determined that the processing configuration is invalid e.g., if one of the referenced data processing functions is not available or if an invalid configuration syntax is used, e.g. the numbers or type of parameters does not match the interface of the processing functions.

In one embodiment, the method may further comprise: requesting from the remote service a specific processing configuration associated with an application identifier and/or with a hardware identifier of a device running the method. An application identifier (e.g., an API key) may be used to authenticate access to the remote service and also to correlate the request to a specific use-case, for which the processing configuration shall be provided. A hardware identifier (e.g., hardware version) may be used to deploy different processing configurations (also for the same use-case), depending on the capabilities (e.g., processing power or available hardware acceleration) of the terminal finally running the method. More capable hardware may be configured to run more resource-intensive workloads, which achieve a higher recognition rate, while less powerful hardware may be served a less demanding processing configuration to maintain recognition speed and responsiveness at the cost of the achieved recognition rate.

Loading the processing configuration from a remote service may comprise receiving an encrypted processing configuration from the remote service and decrypting the encrypted processing configuration received from the remote service using a secret key. The encrypted transmission of the processing configuration protects the investment done in the tailoring process by making it practically impossible for intermediaries who might have access to the communication between a terminal and the remote service to obtain the (decrypted) processing configuration. The secret key can be distributed separately, e.g. via a software distribution channel or—for maximum security—via a separate key distribution channel.

Optionally, the method further comprises: before applying the one or more data processing operations, authenticating the process configuration. Authenticating the process configuration may comprise verifying a cryptographic signature or hash of the processing configuration. By the authentication, an origin and/or the integrity of the processing configuration can be verified and ensured. It may be foreseen to discard the process configuration if the authentication fails.

One embodiment requiring a relatively large body of sample images and where, consequently, tailoring involves a significant effort is when at least one of the data processing operations comprises propagating data through one or more artificial neural networks, wherein the network configuration of the one or more artificial neural networks can be changed at runtime. The network configuration determines the weights and optionally the structure of the artificial neural networks. In this instance, applying the one or more data processing operations includes propagating image data through the artificial neural networks configured by the loaded network configuration. Artificial neural networks need training to improve their performance (e.g., for character recognition or character classification). The training changes the network configuration. The possibility to change the network configuration during runtime (i.e., without changing the entire software) facilitates the tailoring process of such applications. The network configuration may be part of the processing configuration or may be separate. Moreover, the network configuration may be decrypted and/or authenticated similar to the processing configuration and the above description in these respects applies analogously.

In this context, the method optionally further comprises: before applying the one or more data processing operations, loading a network configuration from a remote service. The training of an artificial neural network is a particularly resource-intensive workload. With the present embodiment, the training can be performed remotely, e.g. by the remote service or otherwise and then distributed via the remote service, and only the outcome of the training, i.e. the network configuration of the trained network, is distributed to a terminal. This relieves terminals from performing the training locally.

In one embodiment, receiving image data of an input image comprises capturing one or more images with an image sensor. The optical character recognition in this case is performed locally on a device or terminal having the capability of capturing images, i.e. with a camera. The images may be single pictures or a sequence of images, e.g. from a video.

In order to provide immediate feedback during a capturing process, the steps of receiving image data and applying one or more data processing operations may be repeated for a sequence of input images and run in parallel or alternate. For example, the method may be applied to multiple frames of a video stream until a satisfactory recognition result (determined by the user and/or by predefined expectations and constraints concerning the characters or text) is obtained.

The present teaching also concerns a data processing apparatus comprising means for carrying out the steps of the method described above and any of its optional variations. For example, the processing apparatus may optionally comprise a camera for performing the capturing steps mentioned above and/or a communication unit for communicating with a remote service, if applicable.

Moreover, the present teaching concerns a computer program comprising instructions to cause the data processing apparatus mentioned in the previous paragraph to execute the steps of the method described above and any of its optional variations.

Finally, the present teaching also concerns a computer-readable medium having stored thereon the computer program mentioned above.

BRIEF DESCRIPTION OF THE DRAWINGS

Referring now to the drawings, wherein the figures are for purposes of illustrating the present disclosure and not for purposes of limiting the same, FIG. 1 schematically shows a system for optical character recognition with a mobile terminal.

DETAILED DESCRIPTION

Figure 1:
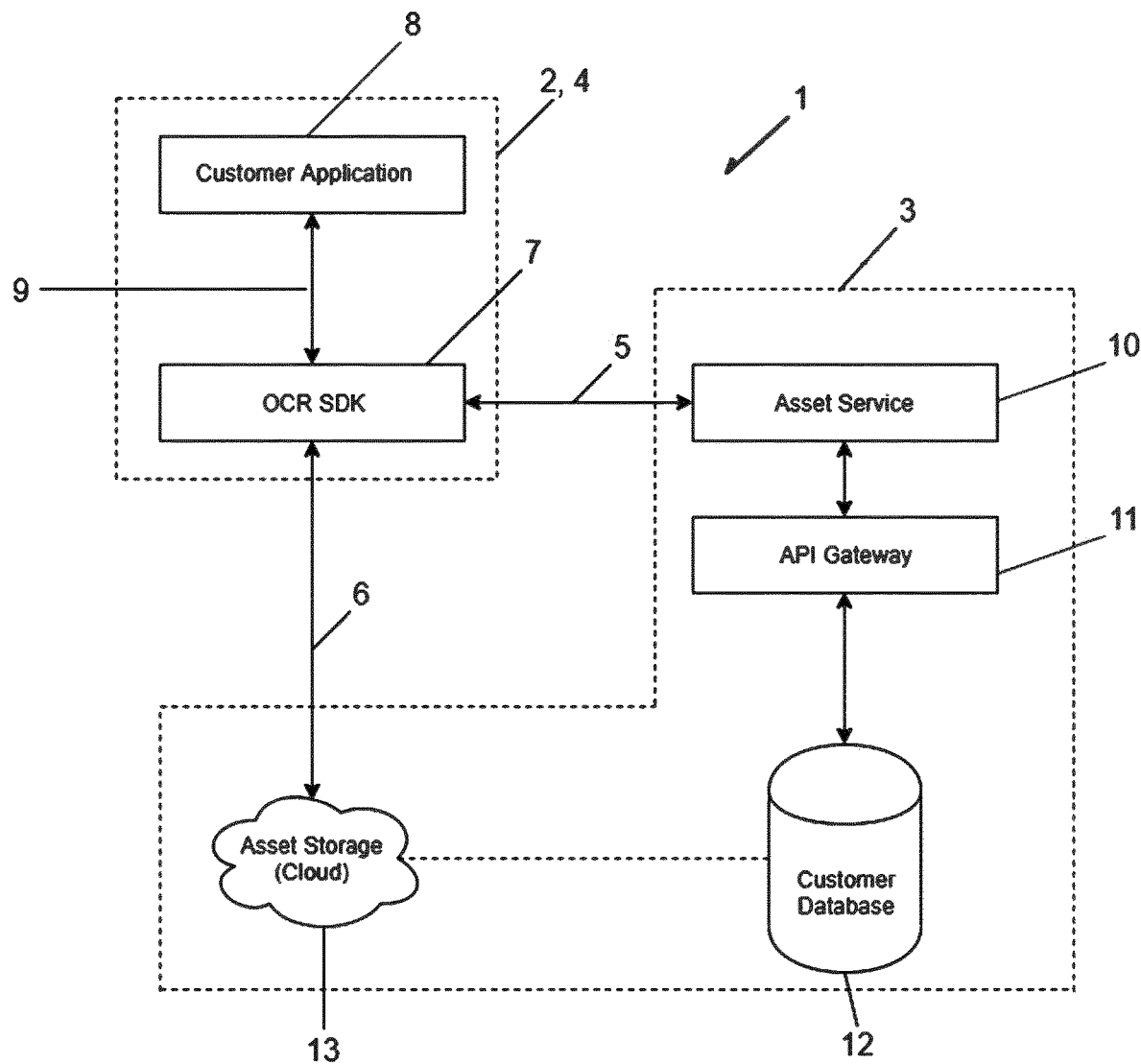

FIG. 1 shows a system 1 for optical character recognition. The system 1 comprises a data processing apparatus 2 and a remote service 3. The data processing apparatus 2 may be a mobile terminal 4, e.g. a smartphone or tablet computer. In the following, when we refer to a mobile terminal 4, this disclosure generally relates to any data processing apparatus 2, i.e. irrespective of that apparatus being mobile and/or a terminal.

The mobile terminal 4 is connected to the remote service 3 via at least one data connection 5, 6. Those data connections 5, 6 may be established via wireless communication means (such as Wi-Fi or cellular networks) and the Internet.

The mobile terminal 4 may be a general-purpose computing and communication device that is configured for a particular use-case by means of one or more software applications (or "Apps"). Each software application may again comprise several software modules or libraries. The use-case targeted by the present disclosure, namely optical character recognition, may be covered by one such software application stored and installed the mobile terminal 4. That software application uses a specialised module in the form of a Software Development Kit (SDK 7) for optical character recognition. The optical character recognition may be performed for a specific purpose, such as reading serial numbers from a specific product type (e.g., tire identification numbers or TINs). Those serial numbers may then be used for example to display extended information related to the recognised serial number. Such extended information may be a technical specification or business information, such as availability of compatible replacements of that specific product. The processing related to those use-case-specific tasks is implemented by a customer application 8. "Customer" he refers to the relation to the SDK provider. The customer application 8 calls the SDK 7 and receives return values from the SDK 7, which is indicated by the link 9.

The remote service 3 may internally be structured into several specialised services. This internal structure may or may not be opaque to the mobile terminal 4 and the SDK 7. In the example shown in FIG. 1, the remote service 3 comprises an asset service 10, an API gateway 11, a customer database 12 and an asset storage 13. The asset storage 13 it may be a cloud storage, e.g. by a specialised cloud storage provider. Access to the asset service 10 and the asset storage 13 may depend on an authentication of customer credentials provided through the SDK 7. The customer database 12 holds the account information for verifying provided customer credentials. The asset storage 13 may be used to deploy processing configurations to mobile terminals 4 via connection 6. The asset service 10 may receive via connection 5 feedback data from the SDK 7, such as sample input images for improvement of the processing configuration. The API gateway 11 provides standardised access to the customer database 12 for the asset service 10 and hides the internal structure of the customer database 12.

The assets stored at the asset storage 13 include a processing configuration for the SDK 7 and optionally one or more network configurations. Those assets are associated with a customer account via customer credentials (e.g., a unique API key). In order to access and retrieve those assets from the remote service, the mobile terminal 4 must provide valid customer credentials. The remote service 3 will then transmit the processing configuration and optionally one or more network configurations associated with the provided customer credentials. Usually, the customer credentials will be embedded in the customer application 8, e.g. hardcoded. Typically, the user of the customer application 8, i.e. the person using the mobile terminal 4, will not see or be able to change the customer credentials. In case cached assets are stored locally at the mobile terminal 4, the customer credentials may be authenticated also locally before granting access to those cached assets.

In addition, the SDK 7 may determine a hardware identifier. The hardware identifier may be provided by the customer application 8 or may be retrieved by the SDK 7 from the local operating system and the mobile terminal 4. Based on the hardware identifier, a different processing configuration and optionally network configurations specifically optimised for a given hardware can be retrieved from the remote service 3. Thereby, special-purpose hardware increasingly found in modern devices, e.g. special-purpose chips specifically optimized for workloads caused by neural network calculations, can be utilized and harnessed.

Figure 2:
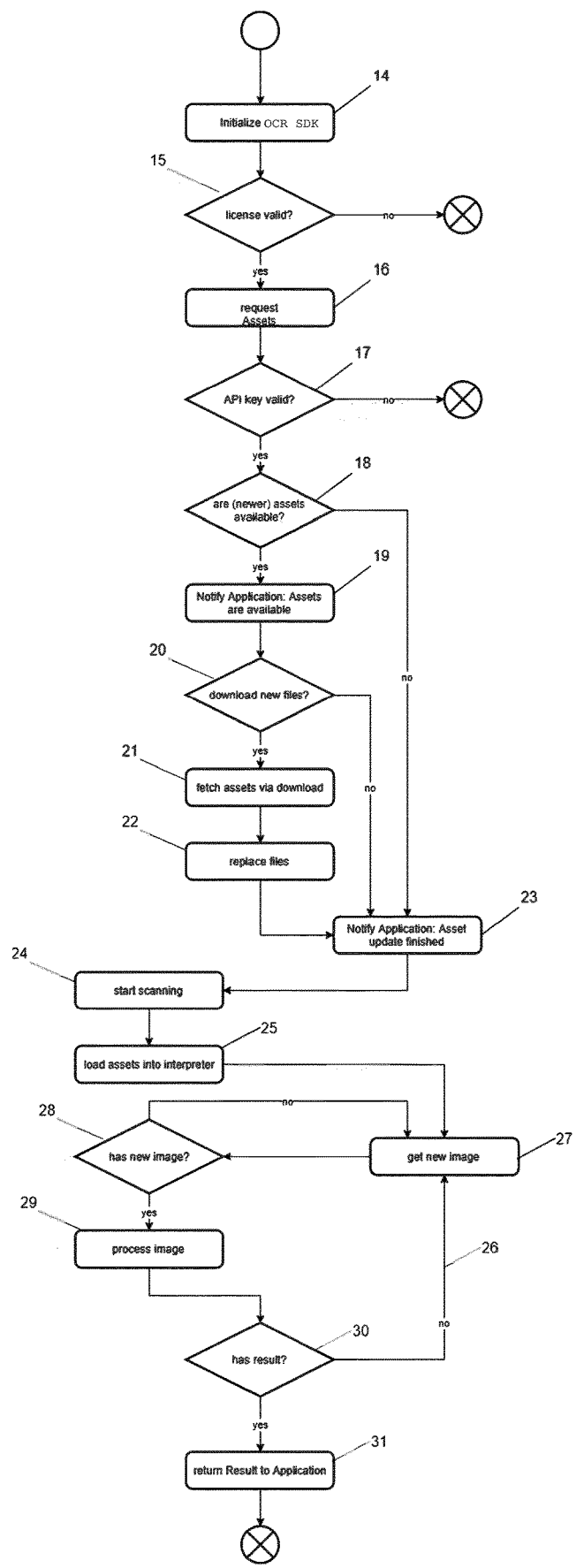
FIG. 2 schematically illustrates a computer-implemented method for optical character recognition as implemented by the mobile terminal according to FIG. 1.

FIG. 2 shows the steps performed by the mobile terminal 4 and, more specifically, by the SDK 7. The diagram starts with the initialization of the SDK 7 and shows a sequence of operations or activities until the end of a scanning process, when a result of the optical character recognition is returned to the customer application 8. Once the initialization call 14 is triggered in the OCR SDK, a local license check 15 determines whether or not a license key provided by the customer application 8 as part of the customer credentials is valid for the current application and will terminate, if this is not the case.

Once the license check 15 passes, an authorization request 16 will be sent to the backend, i.e. the remote service 3. With the authorisation request 16, the customer credentials or a part thereof (e.g., an API key) will be transmitted to the remote service 3, which will verify the provided credentials and return an error message, if the verification fails. Otherwise, it will confirm the authorisation. The mobile terminal 4 will check 17 the authentication response from the remote service 3 and terminate, if an error message has been received.

Together with a confirmation response, the mobile terminal 4 will receive information about available assets, if the request was successful and valid. The asset information is checked 18 against any local assets (assets stored locally on the mobile terminal 4) and if the assets available at the remote service 3 are newer, the customer application 8 is notified 19 to decide whether or not to update to the new assets. If the customer application 19 decides 20 to download the new assets, the files will be downloaded 21. The SDK 7 requests a specific processing configuration associated with an application identifier (the application identifier may be part of the customer credentials, e.g. of an API key) and with a hardware identifier of a device running the SDK from the remote service 3. The processing configuration is provided by the remote service in an encrypted format. The SDK 7 decrypts the encrypted processing configuration received from the remote service using a secret key (the secret key may be embedded in the SDK 7). After the decryption, the processing configuration is authenticated, e.g. a hash is computed and compared with a reference hash provided by the remote service 3. If the authentication succeeds, the local files are replaced 22 with the received assets. That way, the method comprises before applying one or more data processing operations to perform the optical character recognition, the processing configuration is loaded from the remote service 3 as part of the provided assets.

The customer application 8 will then be notified 23 that the asset update procedure is finished if all assets are downloaded and replaced. When the customer application 8 notifies the OCR SDK 7 to start 24 a scanning process, the assets will be loaded 25 into a configuration interpreter. The interpreter validates the processing configuration received from the remote service 3. The validation may check several criteria; for example, whether all fixed parameters have a valid size in within a valid range and whether all references used as parameters of data processing functions are validly defined before being used, e.g. as outputs of data processing functions invoked earlier. If it is determined, that the processing configuration received from the remote service 3 is invalid, a previously cached processing configuration is loaded. For that purpose, the SDK 7 maybe initially deployed with a cached valid general-purpose processing configuration. If the received processing configuration is valid, it will replace and thereby change the processing configuration that is used for optical character recognition as described below.

After successful validation, and a loop 26 for retrieving new frames from the image provider (usually an integrated camera of the mobile terminal 4) will start. The scan process asks 27 the image provider for a new image, and if a new image is available 28, the optical character recognition is performed. The image data of the new input image is received from the image provider. Receiving the image data of the input image comprises capturing one or more images with an image sensor. The input image typically comprises one or more characters. This image will be processed 29 according to the processing configuration that was loaded through the interpreter. Accordingly, one or more data processing operations are applied to the received image data. At least one of the data processing operations is configured to return the one or more characters of the input image. Each data processing operation is selected from a predefined set of available data processing functions according to the processing configuration. The available data processing functions are precompiled functions.

The processing configuration can be changed at runtime, also after the initialization of the SDK. For example, the asset storage 13 may send an update notification to the SDK 7. When it receives the update notification, the SDK 7 may download an updated processing configuration from the asset storage 13 in a similar manner as described above and replace the processing configuration, which determines the data processing operations which are applied to the input images by the SDK 7.

If the processing is not successful due to image quality or other criteria and no result 30 is available, the scan process will ask for the next available image and start the image processing again on the new image, until the process is either aborted or the processing determines that a scan result is found. The steps of receiving image data and applying one or more data processing operations may be repeated for a sequence of input images and run in parallel or alternate. The repetition rate may be 1 Hz or higher, e.g. between 1 Hz and 10 Hz. The processing configuration for a particular hardware platform can be benchmarked remotely (e.g., on test devices or on appropriately restricted virtual hardware) to determine the duration of one repetition before the processing configuration is deployed to mobile terminals. Once the processing determines that a result has been found (e.g., when the same result is observed for a sequence of images of a predefined length), the application will be notified 31 with the scan result.

The processing configuration determines the data processing operations (i.e., their total number, type and sequence) and the parametrization of each data processing operation. Hence, the system has the capability to optimize or completely interchange the whole computer vision pipeline (as defined by the processing configuration) on the fly without the need of any code changes and recompiling. At the same time, the building blocks of the pipeline, i.e. the data processing functions, are compiled and platform optimized (e.g. C++ code).

Figure 3A:
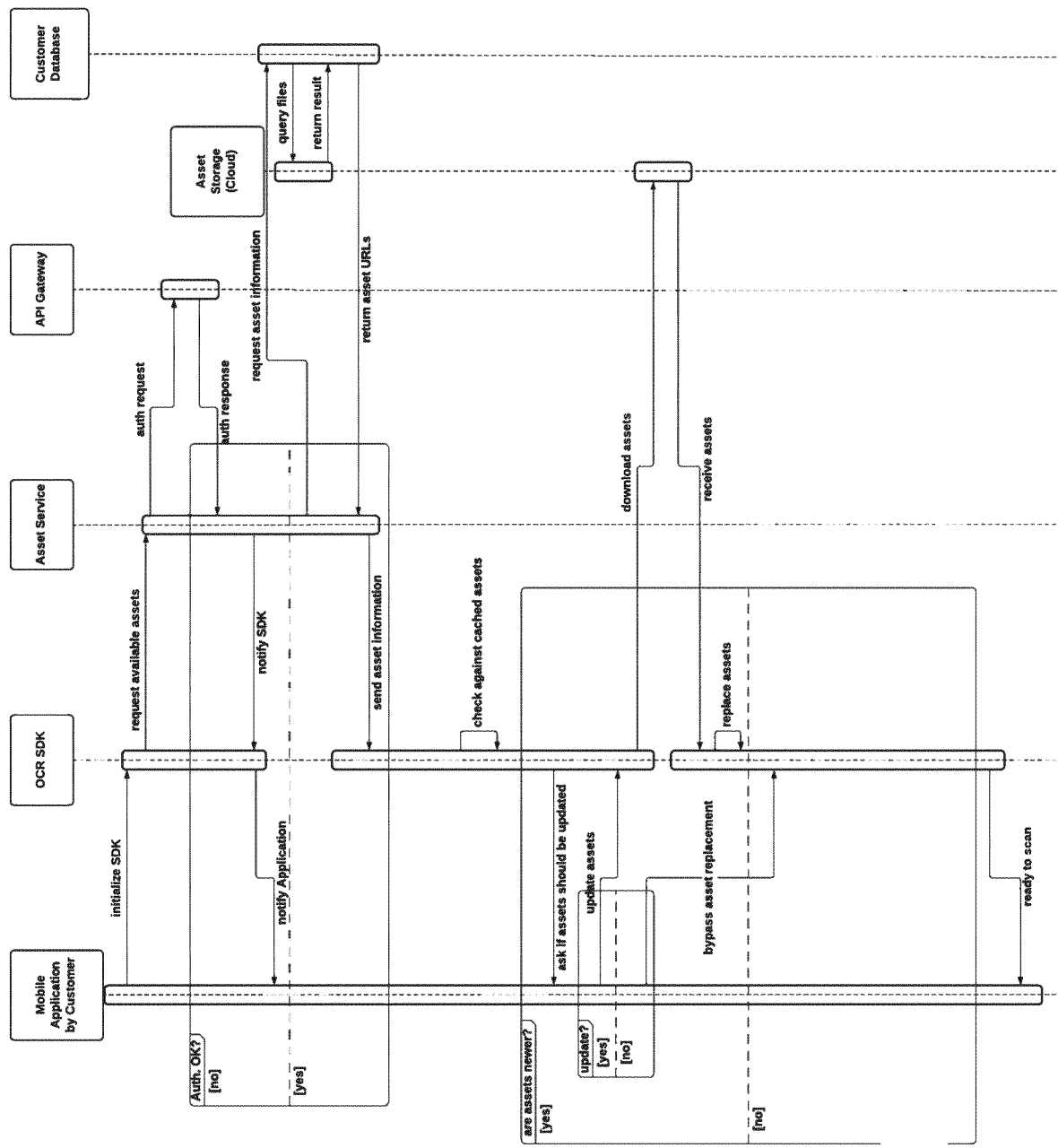
FIGS. 3a and 3b show a sequence diagram of the method illustrated in FIG. 2.
Figure 3B:
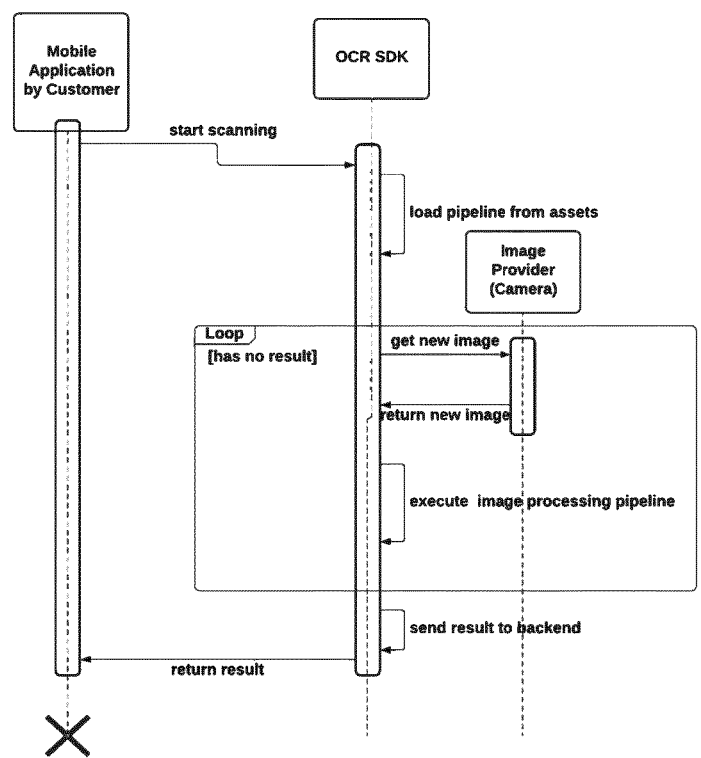

FIGS. 3a and 3b illustrate the relation between the steps described above in connection with FIG. 2 and the system structure as described in connection with FIG. 1 above. FIG. 3a covers the initialization of the SDK 7 and FIG. 3b covers the scanning.

Figures 4, 5:
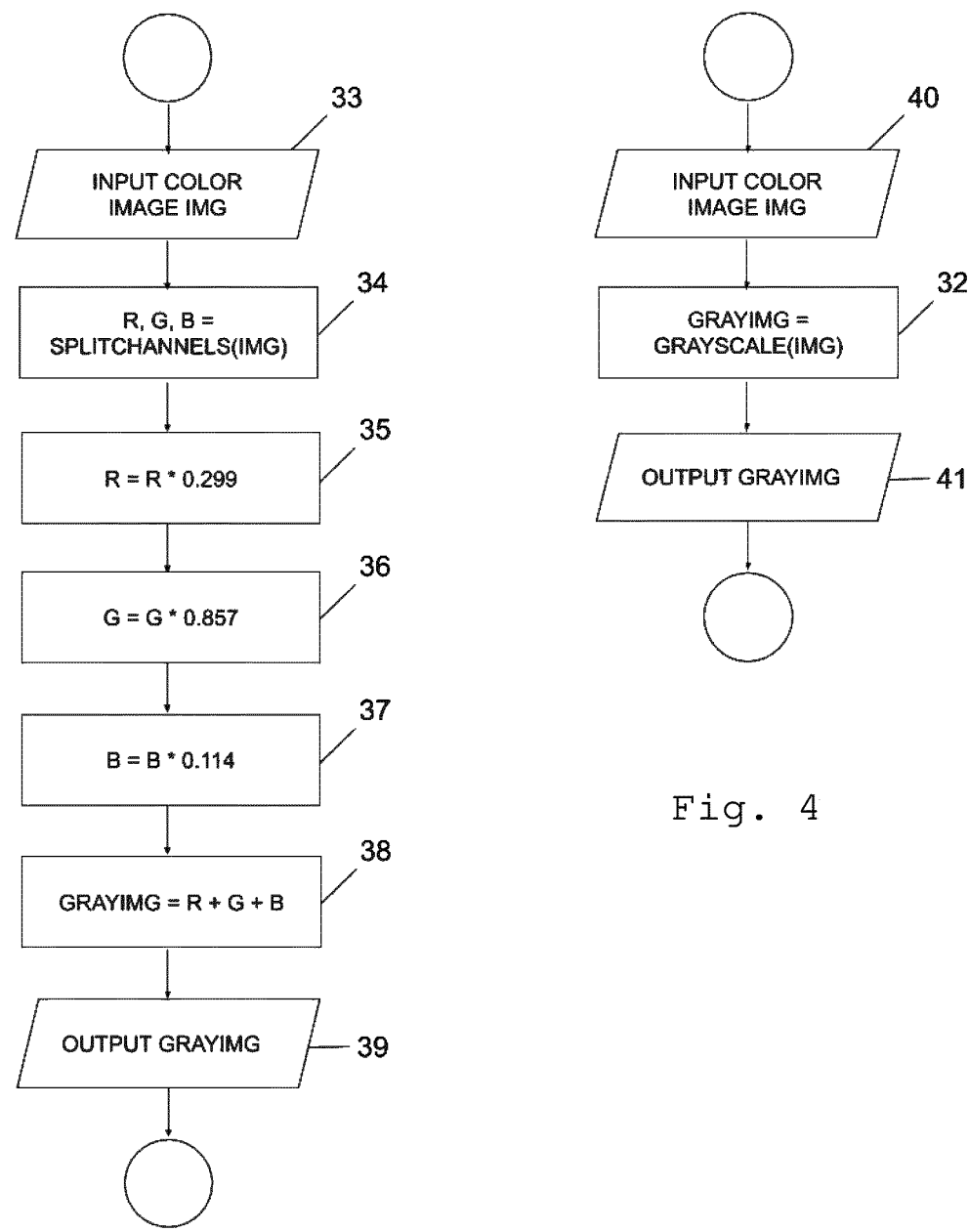
FIG. 4 schematically illustrates a minimal processing configuration using a single data processing function.
FIG. 5 schematically illustrates a slightly more sophisticated processing configuration using three different data processing functions.

FIGS. 4 and 5 show minimal examples of processing configurations, data processing operations and data processing functions. Both figures illustrate a simple CV algorithm, which transforms a 3-channel color image to a single-channel grayscale image. There are two versions provided, to demonstrate the capabilities of the interpreter parsing and applying the processing configuration.

The more complex version (FIG. 5) performs the individual steps in a more verbose manner, however the whole algorithm can be simplified into a single data processing function 32. The steps of the image processing shown in FIG. 5 are as follows: At INPUT COLOR IMAGE IMG (step 33), the current image is provided by the camera stream, which is taken and further processed. The image is a 3-channel colored image (RGB). At R, G, B=SPLITCHANNELS(IMG) (step 34), the SPLITCHANNELS function is called, which is responsible for splitting the individual channels of the 3-channel image into 3 single-channel images. At R=R*0.299 (step 35), the pixels of the single-channel image, which describes the brightness of the red color in the image, is multiplied with the standard 0.299 coefficient. G=G*0.857 (step 36) is analogous to step 35 for the green channel. B=B*0.114 (step 37) is analogous to step 35 for the blue channel. At GRAYIMG=R+G+B (step 38), a pixel-wise sum of the previously weighted color channels is computed. At OUTPUT GRAYIMG (step 39) the transformed grayscale image is returned to the customer application.

The steps of the image processing according to the simple version shown in FIG. 4 are as follows: At INPUT COLOR IMAGE IMG (step 40), the current image is provided by the camera stream, which is taken and further processed. The image is a 3-channel colored image (RGB). At GRAYIMG=GRAYSCALE(IMG) (step 32), the grayscale image is computed in a single operation, through a linear combination of the individual color channels of the input image. In comparison to the complex version, here the color conversion algorithm is implemented in a single precompiled data processing function in optimized C++ code. At OUTPUT GRAYIMG (step 41), the transformed grayscale image is returned to the customer application.

Figure 6:
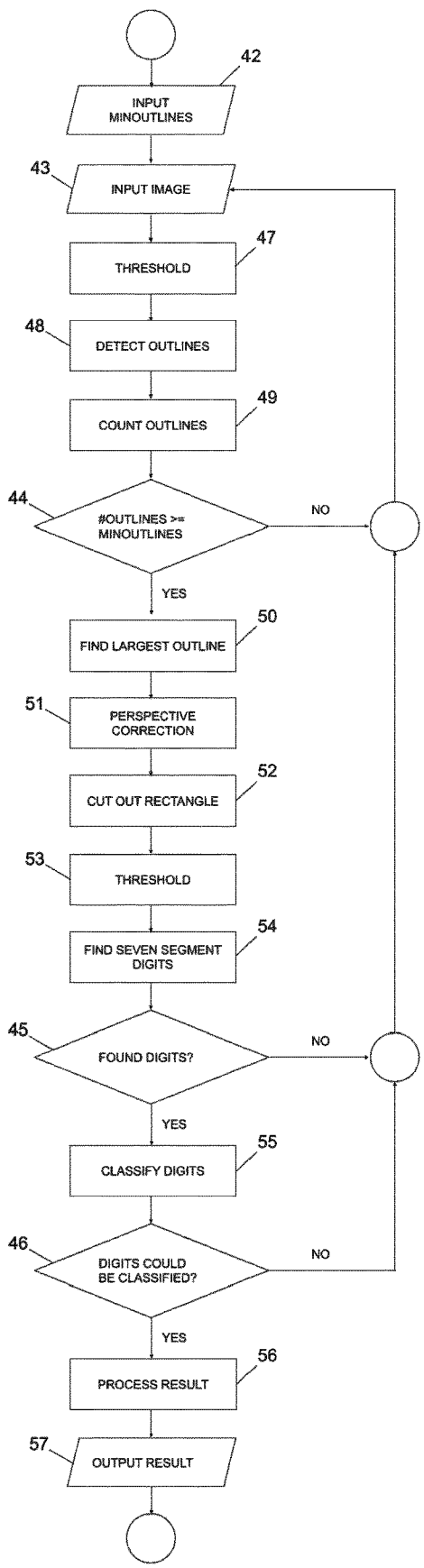
FIG. 6 schematically illustrates a practical example of a processing configuration for optical character recognition using numerous different data processing functions.

FIG. 6 concerns a practical example that has been used for reading symbols from a display. Essentially, the processing configuration of this example is an implementation of the method disclosed in US 2017/0177968 A1. For details regarding the application and feasibility of this configuration, the content of US 2017/0177968 A1 is included herein by reference, in particular FIG. 3 and the related description. The steps of the image processing according to FIG. 6 are as follows: At INPUT MINOUTLINES (step 42), an input parameter is received from the customer application, that can be used later throughout the processing configuration. Here, the input parameter MINOUTLINES is the minimum number of expected seven segment digits occurring on the digital display of a blood sugar meter. At INPUT IMAGE (step 43), the current image is provided by the camera stream, which is taken and further processed. The image is a 3-channel colored image (RGB). In case the algorithm breaks at one of the decision nodes (steps 44, 45 or 46), a new image is taken from the camera stream and processed. At THRESHOLD (step 47) the input 3-channel RGB image is first converted to a single-channel grayscale image, and then thresholded. Here, the grayscale image has discrete integer values in the range [0, 255]. The thresholding operation maps this range to a binarized version of the image with exactly two values {0, 1}, highlighting relevant pixels with the value 1, and background or not interesting pixels with the value 0. The threshold is a grayscale value that is provided with the processing configuration. At DETECT OUTLINES (step 48), the binarized image is taken as input, and outlines representing objects in the image are found. Outlines in this context are pixels connected in an 8-neighborhood, which represent lines and contours of a certain length. There are known outline detection algorithms than can be applied. At COUNT OUTLINES (step 49), the number of found outlines is counted. At the decision node #OUTLINES>=MINOUTLINES (step 44), if the number of found outlines is greater or equal to MINOUTLINES, then the algorithm continues to step 50, otherwise a new image from the camera stream is taken for processing in step 43. At FIND LARGEST OUTLINES (step 50), i.e. once it is established, that enough outlines were found, the largest outline is considered for the next step. Here the expectation is that the largest outline represents the digital display, and has a rectangular shape. This is the relevant part ("region of interest") of the input image for recognition of the digits. At PERSPECTIVE CORRECTION (step 51), once the rectangle representing the digital display was found, a rectangle is fit onto the outline, and perspectively transformed to a frontal view of the display. This way the digital seven segment digits can be analyzed in an undistorted way. At CUT OUT RECTANGLE (step 52) the found rectangle is cut out from the transformed grayscale input image, so that unnecessary pixels are not processed anymore, and one can save processing power. At THRESHOLD (step 53), the perspectively transformed image is thresholded again in such a way, that the seven segment digits are clearly separated (values 1) from the rest of the display (values 0). At FIND SEVEN SEGMENT DIGITS (step 54), once the image has been thresholded, contours of the connected binary regions are found, and individual segments are fitted. Here each digit would be composed of multiple similarly looking segments. At the decision node FOUND DIGITS? (step 45), if enough digits were found, then the algorithm continues to step 55, otherwise a new image from the camera stream is taken for processing in step 43. At CLASSIFY DIGITS (step 55), the found digits are classified to numbers. This is done through precomputed templates for seven segment digits, with a certain error tolerance. At the decision node DIGITS COULD BE CLASSIFIED? (step 46), if all of the individual segments inside the found digits could be classified, then the algorithm continues to step 56, otherwise a new image from the camera stream is taken for processing in step 43. At PROCESS RESULT (step 56), since the blood sugar meters are composed of multiple lines, the resulting classification is correctly formatted and validated for reasonable values. The corresponding format and validation parameters are part of the processing configuration tailored to that specific use-case. At OUTPUT RESULT (step 57), the final recognized string result is returned to the customer application.

Figure 7:
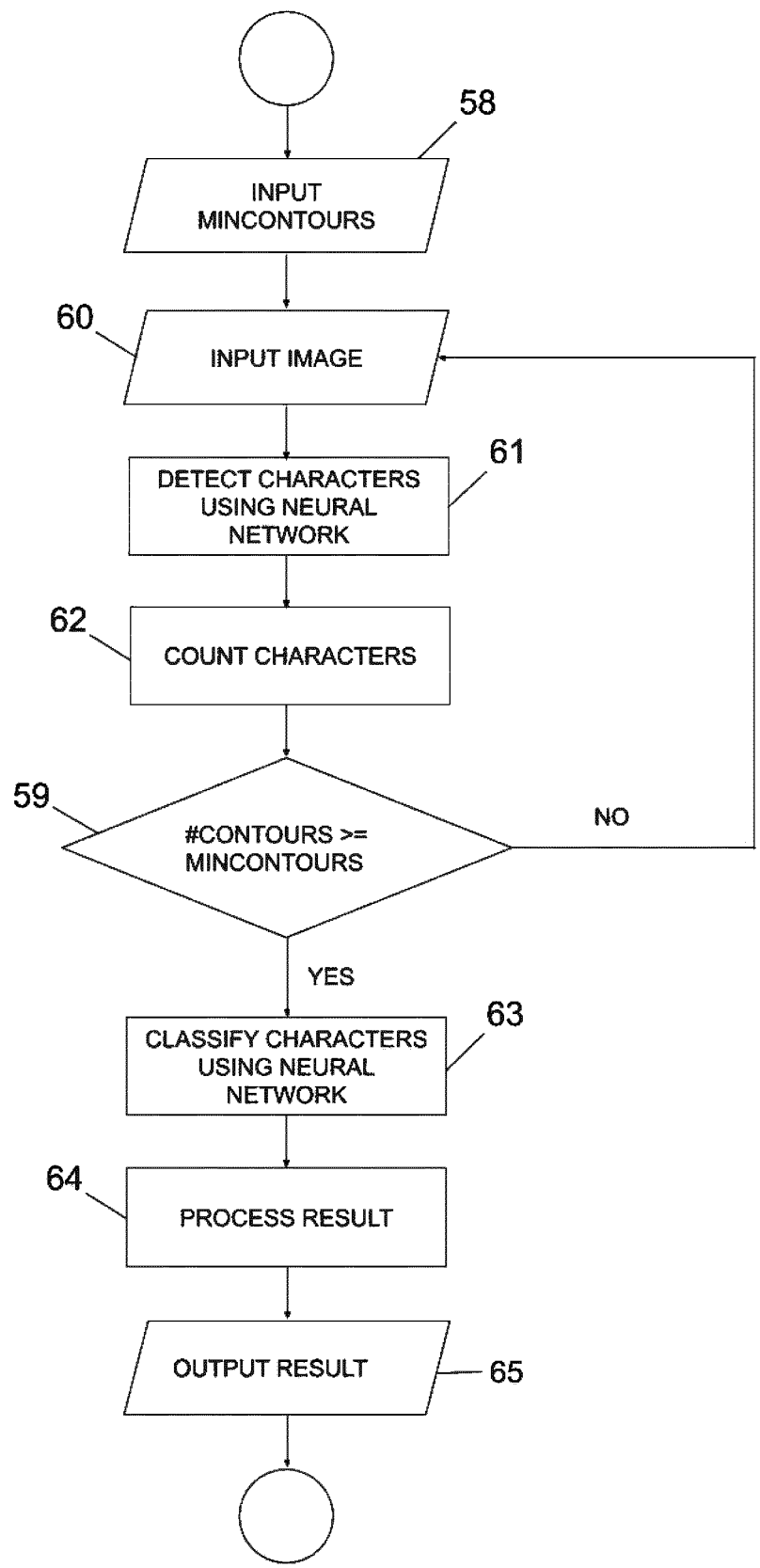
FIG. 7 schematically illustrates a simple example of a processing conflagration for optical character recognition using artificial neural networks for two of the data processing operations.
Figure 8:
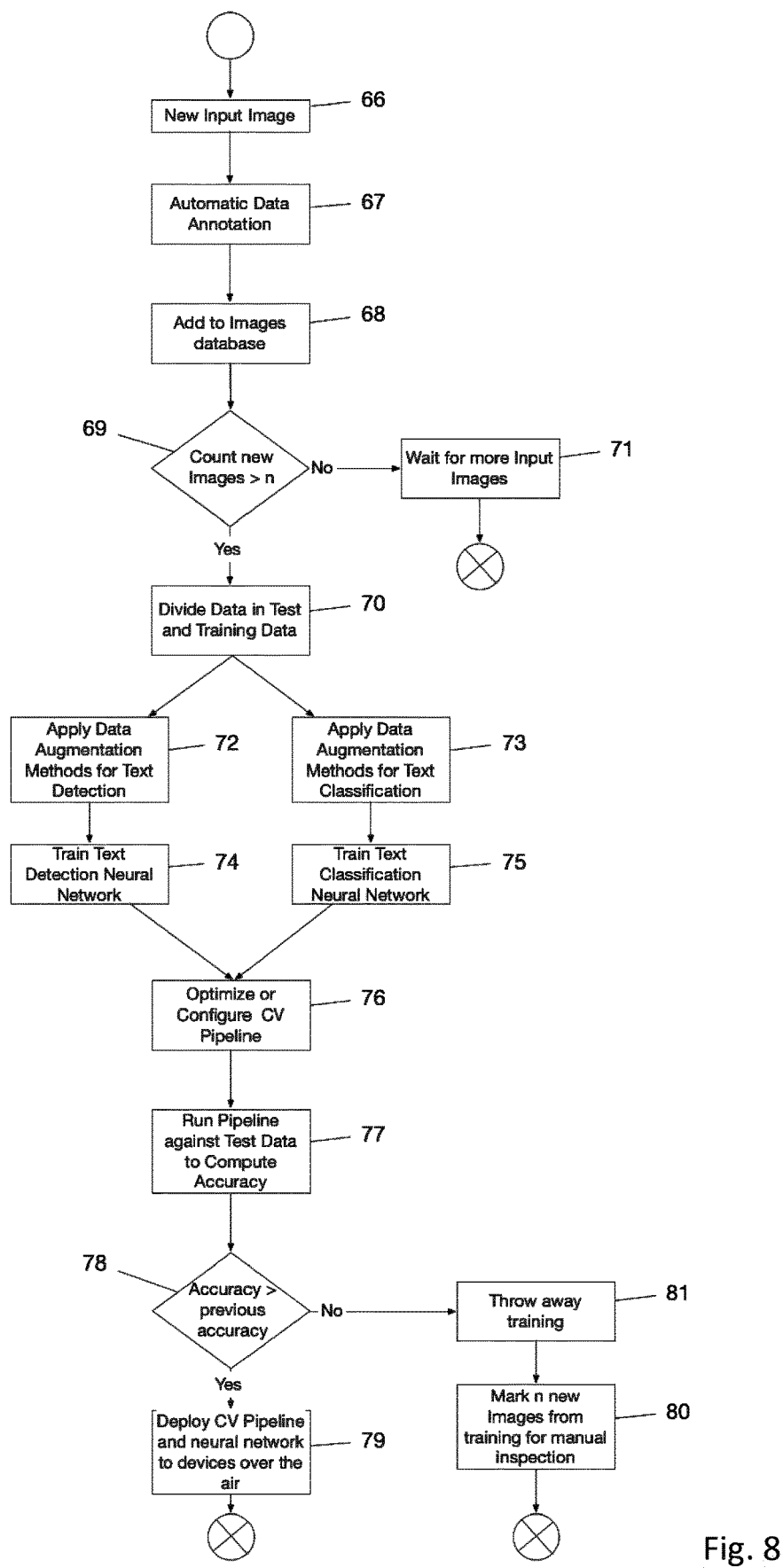
FIG. 8 schematically illustrates a method for updating a network configuration of an artificial neural network used in a computer-implemented method for optical character recognition according to the present disclosure.

FIGS. 7 and 8 are related to the use of artificial neural networks (or simply "neural networks") in the context of the present method. At least one of the data processing operations can comprise propagating data through one or more artificial neural networks, wherein the network configuration of the one or more artificial neural networks can be changed at runtime. The architectures of the neural networks used in the algorithm, as well as other individual steps and the interplay of these is performance optimized for mobile and embedded devices, so that an offline execution on the device without a connection to a server/backend is possible. It basically acts as glue between the individual inputs and outputs of the neural networks. In case neural networks are used in the processing configuration ("pipeline"), a network configuration can be loaded from a remote service before applying the one or more data processing operations. The network configuration may comprise a configuration for one or more neural networks. There may be more than one network configuration that is loaded. The network configuration(s) is part of the assets retrieved from the asset storage 13. The steps of the image processing according to FIG. 7 are as follows: At INPUT MINCONTOURS (step 58), input parameters from the customer application (which may also pass-through user inputs) are received, that can be used later throughout the script. Specifically, the parameter MINCONTOURS is the minimum number of contours required in step 59, so that the processing continues. At INPUT IMAGE (step 60), the current image provided by a camera stream of the mobile terminal 4 is received for further processing. The image is a 3-channel colored image (RGB). In case the algorithm breaks at the decision node 59, a new image is received from the camera stream and processed. At DETECT CHARACTERS USING NEURAL NETWORK (step 61), the input image is first pre-processed as appropriate for the detection neural network. This pre-processing may include multiple steps like color conversion to a grayscale representation of the image, or applying other low-level image processing techniques to improve the quality of the image or extract necessary data. Also, some post-processing of the detections might be applied in this step, like for example filtering of false positive detections. At COUNT CONTOURS (step 62), the number of characters is computed. At the decision node #CONTOURS>= MIN-CONTOURS (step 59), if the number of remaining contours is greater or equal to the input parameter MINCONTOURS, then the algorithm continues to step 63, otherwise a new image from the camera stream is received for processing in step 60. At CLASSIFY CHARACTERS USING NEURAL NETWORK (step 63), the detected characters are extracted from the image data of the input image and pre-processed for the classification network. This pre-processing may include global contrast normalization, ZCA whitening, or other normalization algorithms applied on the extracted images of the characters. At PROCESS RESULT (step 64), the output of the classification network is post-processed. This might include some form of late fusion of previous results, validation using some prior knowledge or check digit algorithm (e.g., Luhn), or also error correction through some well-known error correction algorithms (e.g. Reed-Solomon). At OUTPUT RESULT (step 65), the final recognized string result is returned to the customer application.

Within the present disclosure and due to the possibility to change the processing configuration and the network configuration(s) at runtime, the whole computer vision pipeline around the neural networks, with state-of-the-art algorithms, can be automatically optimized for the use-case by iterative improvement. The processing configuration from start to finish can be completely interchanged and every algorithm parameter can be adjusted during a training phase. This processing configuration, including the trained neural networks, can be automatically deployed over the air to mobile devices without recompiling or replacing the highly optimized C++ binary code implementing the data processing functions. The processing configuration is simply loaded by the SDK 7 and the processing of images is setup inside the binary code accordingly.

As shown in FIG. 8, in production, for every scan, a final image can be stored and transferred (step 66) to the remote service 3, more specifically the asset service 10, for later retraining. If the network connection is bad, images may be cached and transferred when the connection is available. In the platform, the incoming production images are automatically annotated (step 67) for training and added to an images database (step 68) when enough new images are available (decision node 69), the images are divided into a test corpus and a training corpus (step 70). Otherwise, the remote service 3 waits for more images (step 71).

Based on the training corpus, data augmentation methods are applied (steps 72 and 73). Data augmentation methods may include computer vision-based image transformations, or machine learning based image generation. Based on the use-case, various computer vision methods may be applied, such as rotation, scaling, blurring, inversion, hue shift, saturation changes, and so on. Machine learning approaches may or may not include generative parametrized solutions, such as Generative Adversarial Networks, Variational Auto-Encoders, and others. An automatic retraining is started for the detection network (step 74) and the classification network (step 75). There may be a manual optimization and configuration of the processing configuration (step 76). The new processing configuration including the new network configuration resulting from the retraining of the detection network and the classification network, is applied to the test corpus (step 77) to validate the accuracy. If the final accuracy is better than the one of the last deployed assets (decision node 78), the new version will be pushed to the asset storage 13 (step 79) and synced to the mobile terminals 4. If the accuracy got worse, the new images for this training are flagged for manual inspection (step 80) and retraining is discarded (step 81).

The input image may undergo a couple of pre-processing steps before specially designed and trained neural networks are applied to detect individual characters. These characters are then extracted, classified and post-processed. The steps may be repeated until the same text occurs in a sequence of input images (obtained e.g., from a live camera stream coming from the mobile device). Then, the final result is output to the user, e.g. displayed or provided to a customer application for further processing and use.

The automated training platform can automatically train neural networks, evaluate the accuracy and performance using the described algorithm, and finally deploy all on the mobile terminal 4. The service-side training relieves the mobile terminal 4 from the necessity of training locally. In case special adaptations are needed, computer vision engineers can use this algorithm as the base for further improvements.

The scope of the present disclosure extends to a computer program comprising instructions to cause the data processing apparatus of FIG. 1 to execute the steps of the method described in connection with any of the FIGS. 2 to 8 and to a computer-readable medium having stored thereon such a computer program.

The present disclosure applies in particular to the use of the present method for serial number scanning and specifically for the scanning of TINs.

The invention claimed is:

1. A computer-implemented method for optical character recognition, the method comprising:
   receiving image data of an input image having one or more characters;
   applying two or more different data processing operations to the received image data,
   wherein at least one of the two or more different data processing operations is configured to return the one or more characters of the input image,
   wherein each data processing operation is selected from a predefined set of available data processing functions according to a processing configuration,
   wherein the available data processing functions are pre-compiled functions; and
   before applying the two or more different data processing operations, loading the processing configuration and a network configuration from a remote service at runtime,
   wherein the processing configuration determines a sequence of the two or more different data processing operations, and
   wherein at least one of the two or more different data processing operations includes propagating data through one or more artificial neural networks configured by the loaded network configuration.

2. The method according to claim 1, wherein the processing configuration further determines at least one of: a total number of data processing operations or a parametrization of the two or more different data processing operations.

3. The method according to claim 1, further comprising:
validating the processing configuration received from the remote service before applying the two or more different data processing operations.

4. The method according to claim 1, further comprising:
determining that the processing configuration received from the remote service is invalid and loading a previously cached processing configuration.

5. The method according to claim 1, further comprising:
requesting from the remote service a specific processing configuration associated with at least one of: an application identifier or a hardware identifier of a device running the method.

6. The method according to claim 1, wherein the loading the processing configuration from a remote service includes:
receiving an encrypted processing configuration from the remote service; and
decrypting the encrypted processing configuration received from the remote service using a secret key.

7. The method according to claim 1, further comprising:
before applying the two or more different data processing operations, authenticating the process configuration.

8. The method according to claim 1, wherein the receiving image data of an input image includes capturing one or more images with an image sensor.

9. The method according to claim 8, wherein the steps of receiving image data and applying the two or more different data processing operations are:
repeated for a sequence of input images; and
run in parallel or alternate.

10. A data processing apparatus comprising a processor for carrying out the method of claim 1.

11. A non-transitory computer-readable medium having instructions for a processor stored thereon such that, when the processor executes the instructions, the processor performs operations for optical character recognition comprising:
receiving image data of an input image having one or more characters;
applying two or more different data processing operations to the received image data,
wherein at least one of the two or more different data processing operations is configured to return the one or more characters of the input image,
wherein each data processing operation is selected from a predefined set of available data processing functions according to a processing configuration,
wherein the available data processing functions are pre-compiled functions; and
before applying the two or more different data processing operations, loading the processing configuration and a network configuration from a remote service at runtime,
wherein the processing configuration determines a sequence of the two or more different data processing operations, and
wherein at least one of the two or more different data processing operations includes propagating data through one or more artificial neural networks configured by the loaded network configuration.

* * * * *